(12) United States Patent
Erickson et al.

(10) Patent No.: US 11,685,114 B2
(45) Date of Patent: Jun. 27, 2023

(54) ADDITIVE MANUFACTURING OF THREE-DIMENSIONAL OBJECT

(71) Applicant: Hewlett-Packard Development Company, L.P., Spring, TX (US)

(72) Inventors: Kristopher Erickson, Palo Alto, CA (US); Jarrid Wittkopf, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/258,315

(22) PCT Filed: Jan. 15, 2019

(86) PCT No.: PCT/US2019/013650
§ 371 (c)(1),
(2) Date: Jan. 6, 2021

(87) PCT Pub. No.: WO2020/149834
PCT Pub. Date: Jul. 23, 2020

(65) Prior Publication Data
US 2021/0331388 A1 Oct. 28, 2021

(51) Int. Cl.
*B29C 64/188* (2017.01)
*B29C 64/393* (2017.01)
(Continued)

(52) U.S. Cl.
CPC .......... *B29C 64/188* (2017.08); *B29C 64/165* (2017.08); *B29C 64/209* (2017.08);
(Continued)

(58) Field of Classification Search
CPC ... B29C 64/188; B29C 64/165; B29C 64/393; B33Y 10/00; B33Y 50/02
See application file for complete search history.

(56) References Cited

U.S. PATENT DOCUMENTS 8,858,856 B2 10/2014 Kozlak et al.
9,656,428 B2 5/2017 Voris et al.
(Continued)

FOREIGN PATENT DOCUMENTS

CN 1535202 A 10/2004
CN 103635305 A 3/2014
(Continued)

*Primary Examiner* — Timothy Kennedy
*Assistant Examiner* — Farah Taufiq
(74) *Attorney, Agent, or Firm* — Shook, Hardy & Bacon, L.L.P.

(57) ABSTRACT

Some examples include an additive manufacturing system including a processor and a memory to store instructions. The instructions cause the processor to generate print data from received data related to a three-dimensional build object. The generated print data includes defined print data to dispensing a first agent at a build area of a build material layer, defined print data to selectively dispensing a second agent at a component receiving area within the build area of the build material layer, the second agent to locally reduce a viscosity of the build material at the component receiving area to a viscous state, and defined print data to position a component within the component receiving area at a time of the component receiving area being in a viscous state.

10 Claims, 5 Drawing Sheets

(51) Int. Cl.
  *B29C 64/165* (2017.01)
  *B33Y 10/00* (2015.01)
  *B33Y 30/00* (2015.01)
  *B33Y 50/02* (2015.01)
  *B29C 64/264* (2017.01)
  *B29C 64/209* (2017.01)
  *B29L 31/34* (2006.01)

(52) U.S. Cl.
  CPC .......... *B29C 64/264* (2017.08); *B29C 64/393* (2017.08); *B33Y 10/00* (2014.12); *B33Y 30/00* (2014.12); *B33Y 50/02* (2014.12); *B29L 2031/34* (2013.01)

(56) References Cited

U.S. PATENT DOCUMENTS

| | | | |
|---|---|---|---|
| 2004/0145088 A1* | 7/2004 | Patel | B29C 41/003 264/494 |
| 2004/0232583 A1 | 11/2004 | Monsheimer et al. | |
| 2016/0198576 A1 | 7/2016 | Lewis et al. | |
| 2016/0214327 A1 | 7/2016 | Uckelmann et al. | |
| 2017/0015065 A1 | 1/2017 | Potter et al. | |
| 2017/0274593 A1 | 9/2017 | Nauka et al. | |
| 2018/0009171 A1 | 1/2018 | Donovan et al. | |
| 2018/0050486 A1 | 2/2018 | Talgorn et al. | |
| 2018/0104894 A1 | 4/2018 | Fung et al. | |
| 2018/0147777 A1 | 5/2018 | Abbott et al. | |
| 2018/0264753 A1 | 9/2018 | Kornilovich et al. | |
| 2019/0176390 A1 | 6/2019 | White et al. | |
| 2019/0346313 A1* | 11/2019 | Cox | G01K 7/02 |
| 2021/0214570 A1 | 7/2021 | Prasad et al. | |

FOREIGN PATENT DOCUMENTS

| | | |
|---|---|---|
| CN | 105408095 A | 3/2016 |
| CN | 107000310 A | 8/2017 |
| CN | 107405826 A | 11/2017 |
| CN | 107530965 A | 1/2018 |
| CN | 108137920 A | 6/2018 |
| CN | 108698314 A | 10/2018 |
| CN | 109070463 A | 12/2018 |
| EP | 3233425 A1 | 10/2017 |
| EP | 3311984 A1 | 4/2018 |
| TW | 201808585 A | 3/2018 |
| WO | 03/16030 A1 | 2/2003 |
| WO | WO-2017074397 A1 | 5/2017 |
| WO | WO-2017180162 A1 | 10/2017 |
| WO | 2017/196330 A1 | 11/2017 |
| WO | WO-2018049151 A | 3/2018 |
| WO | WO-2018160287 A1 | 9/2018 |

* cited by examiner

ADDITIVE MANUFACTURING OF THREE-DIMENSIONAL OBJECT

BACKGROUND

Additive manufacturing machines produce three dimensional (3D) objects by building up layers of material. Some 3D printing techniques are considered additive processes because they involve the application of successive layers of material. Some additive manufacturing machines are commonly referred to as "3D printers". 3D printers and other additive manufacturing machines make it possible to convert a CAD (computer aided design) model of other digital representation of an object into the physical object.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

It can be useful to track and trace three-dimensional (3D) printed objects during and/or after fabrication. Optical indicators (e.g., matrix or two-dimensional barcode, observable surface pattern or roughness, etc.) defined during the 3D printing process provide a means of allowing the 3D printed object to be scanned and correlated back to a database with information about the 3D printed object. However, these optical indicators lack the ability to continuously or periodically modify data defined within the 3D printed object during the lifecycle of the 3D printed object. Additionally, if the 3D printed object is damaged and the optical indicator is marred it could be unreadable and the 3D printed object may not be able to be correlated back to a database storing information related to the 3D printed object. In accordance with aspects of the present disclosure, additive manufacturing processes can be used to fabricate three-dimensional (3D) objects including electronic components disposed within the 3D objects (e.g., radio-frequency identification devices (RFIDs)) that can be useful in tracking and tracing the 3D object during the lifecycle of the 3D printed object.

Examples of the present disclosure are discussed within the context of a including electronic components within a 3D printed object during an additive manufacturing process. Other components that are pre-formed prior to the additive manufacturing, and embedded within the 3D printed object, can also be used. It can be useful to embed electronic components and/or other pre-formed components within a 3D printed object. Conventionally, this has been accomplished by using an additive manufacturing process in combination with other fabrication processes (which can include other additive manufacturing processes). For example, one or more additive manufacturing processes can be used to fuse and fabricate a body of the 3D printed object. Subsequently, the 3D printed object is removed from the additive manufacturing system and electronic components and/or other components are added to the object, typically by hand, to be either to be enclosed within the body of the 3D printed object or to be disposed on a surface of the 3D printed object. Additional additive manufacturing processes can be performed after installation and/or connection of the electronic components, for example, to enclose the electronic components.

This approach can slow the overall fabrication process, as additive manufacturing processes are typically paused in order to install and connect the electronic components, or electronic devices. Moreover, the quality of the physical and electrical connections of the electronic components can be less than optimal depending on the pliability of regions in which the electronic components are to be disposed, which begin to cool and harden once removed from the additive manufacturing system.

Examples of the present disclosure fabricate three-dimensional objects including components, such as electronic components, using a single additive manufacturing process by leveraging conditions of the single additive manufacturing process to facilitate physical and electrical connection of the electronic components. For instance, during some types of additive manufacturing processes, such as multi jet fusion processes, heat is used to fuse the materials that form the layers of the three-dimensional object. Examples of the present disclosure insert a component, such as an electronic device or other pre-formed device or object, into a three-dimensional object being fabricated simultaneously with fabrication of the three-dimensional object. Thus, the heat used to fuse the layers of the object layers can also be used to effectively fuse the electronic component to the object without employing an extra process outside of the additive manufacturing process. Additional layers of the three-dimensional object can subsequently be fabricated over the electronic component using the same additive manufacturing process. This results in a robust physical and electrical connection between the object materials and the electronic component with minimal delay or disruption of the additive manufacturing process.

Examples of the present disclosure are discussed within the context of a multi jet fusion additive manufacturing process. Other types of additive manufacturing processes and systems, including systems based on three-dimensional binder jetting can also be employed. In an additive manufacturing process, a computer controls the spreading of build material (e.g., powder) and fusing, or binding, agents to form successive layers of material according to a digital model of a 3D object. The fusing agents can contain energy absorbing materials or binding materials that cause the build material to fuse together to form the object. Additionally, detailing agents can be employed to sharpen the resolution of the object and provide cooling to selected regions within the bed. Functional agents can also be used to provide functionality to the object (e.g., electrical conductivity), or other agents. Some agents can serve more than one purpose (e.g., acting as both a fusing agent and a functional agent, for example). Each of these agents can be activated under certain conditions such as exposure to heat or energy. Thus, as the successive layers fuse to each other, a three-dimensional object is formed.

Figure 1:
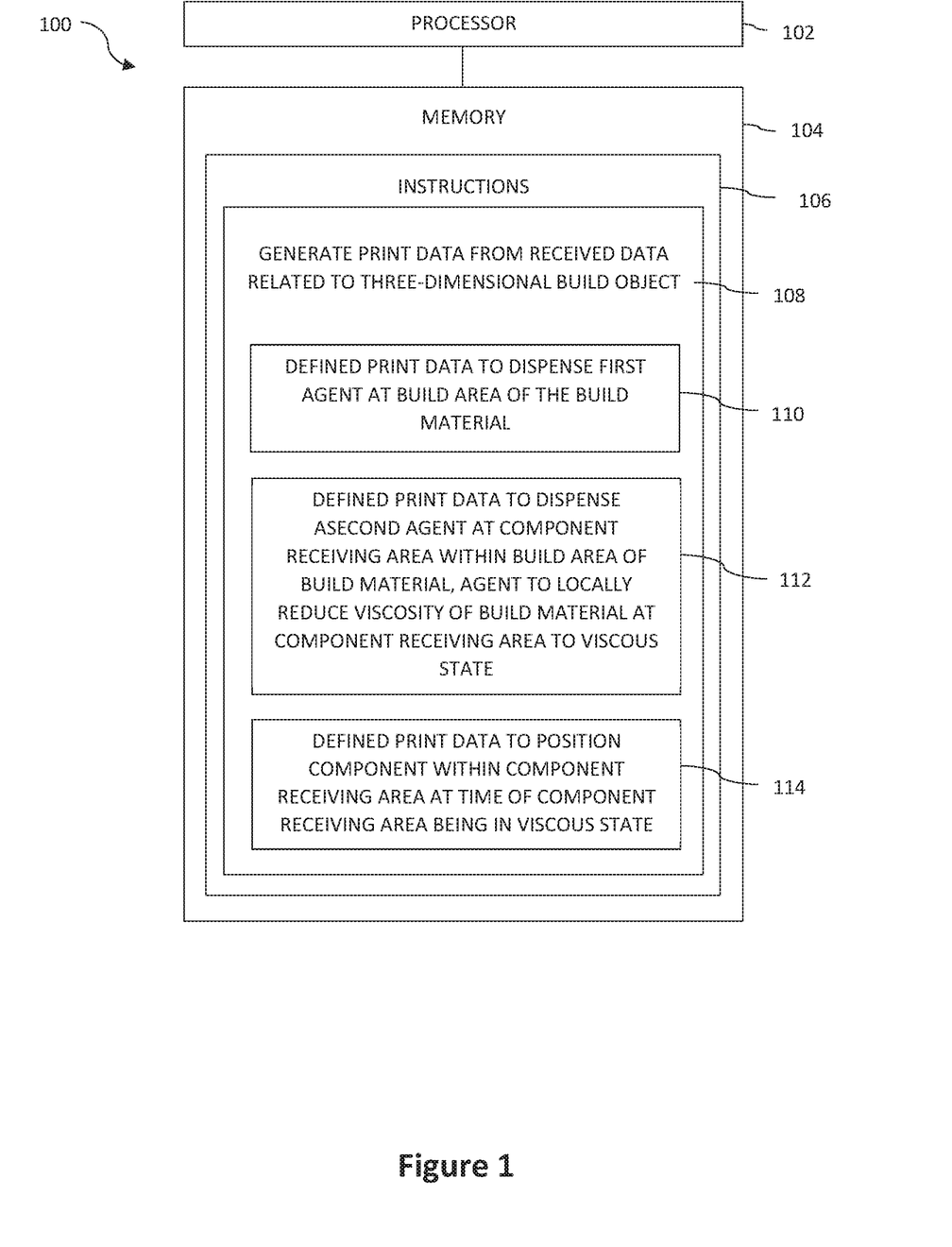
FIG. 1 is a block diagram of an example additive manufacturing system in accordance with aspects of the present disclosure.

FIG. 1 is a block diagram of an example additive manufacturing system 100 useful in forming a 3D printed object in accordance with aspects of the present disclosure. Additive manufacturing system 100 includes a processor 102 and a memory 104. Memory 102 and processor 104 can be in communication with a data store (not shown) that can include data pertaining to a 3D build object to be formed by the additive manufacturing system 100. Memory 102 and/or processor 104 can receive data defining an object to be printed including, for example, 3D object model data. In one example, the 3D object model data includes data related to the build object size, shape, position, orientation, conductivity, color, etc. The data can be received from Computer Aided Design (CAD) systems or other electronic systems useful in the creation of a three-dimensional build object. Processor 104 can manipulate and transform the received and/or stored data to generate print data. Processor 104 employs print data derived from the 3D build object model data of the 3D build object to be formed in order to control elements of the additive manufacturing system 100 to selectively deliver/apply build material, printing agents, and energy.

Processor 102 can control operations of additive manufacturing system 100 and can be a semiconductor-based microprocessor, a central processing unit (CPU), and application specific integrated circuit (ASIC), field-programmable gate array (FPGA), and/or other hardware device. Memory 104 can store data, programs, instructions, or any other machine readable data that can be utilized to operate the additive manufacturing system 100. Memory 104 can store computer readable instructions 106 that processor 102 can process, or execute. Memory 102 can be an electronic, magnetic, optical, or other physical storage device that contains or stores executable instructions 106. Memory 102 can be, for example, Random Access Memory (RAM), an Electrically Erasable Programmable Read-Only Memory (EEPROM), a storage device, an optical disc, etc. Memory 102 can be a non-transitory machine-readable storage medium.

Instructions 106 can include a set of instructions 108-114. Instruction 108 is to generate print data from received data related to a three-dimensional build object. Instruction 110 can include defining print data to dispense a first agent at a build area of a build material layer. Instruction 112 can include defining print data to selectively dispense a second agent at a component receiving area within the build area of the build material layer, the agent to locally reduce a viscosity of the build material at the component receiving area to a viscous, or molten, state. Instruction 114 can include defining print data to position a component within the component receiving area at a time of the component receiving area being in a viscous state.

Figure 2:
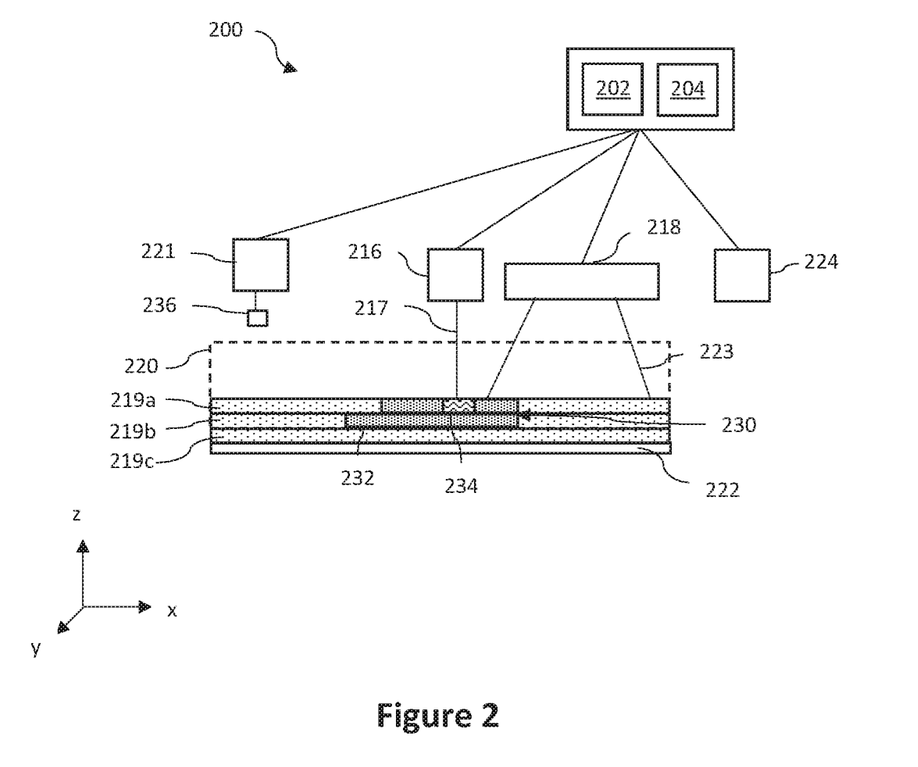
FIG. 2 is a schematic diagram of an example additive manufacturing system in accordance with aspects of the present disclosure.

FIG. 2 is a schematic diagram of an example additive manufacturing system 200 in accordance with aspects of the present disclosure. Additive manufacturing system 200 includes a processor 202, a memory 204, a fluid applicator 216, an energy source 218, and a component placement apparatus 221. Processor 202 and memory 204 are similar to processor 102 and 104 described above. Memory 204 stores instructions to generate print data from received data related to a three-dimensional build object. Processor 202 can generate defined print data, which may be represented as physical (electronic) quantities, in order to cause fluid applicator 216 and energy source 218 to create the 3D build object including a component 236, as described further below.

In some examples, additive manufacturing system 200 for fabricating a 3D object includes a carriage (not shown) movable relative to a build pad 222 along a bi-directional travel path and supporting a fluid applicator (e.g., printhead) 216 and a fusing energy (e.g., radiation) source 218. In some examples, a combination of at least the carriage, energy source 218 and fluid applicator 216 can be referred to as a printing assembly. In one example, component placement apparatus 221 is carried on a separate carriage (not shown). Fluid applicator 216 is to selectively dispense, or apply, a plurality of fluid agents including a second, or fusing, agent. Fluid applicator 216 can also selectively dispense a first, or additive, fusing agent, a detailing agent, functional agents, etc. Energy source 218 can heat the build material and agents dispensed onto the build material. Component placement apparatus 221 can position component 236 (e.g., electronic component or device) within the heated build material, as discussed further below. Processor 202 can generate defined print data in order to cause fluid applicator 216, energy source 218, and component placement apparatus 221 to create the build object 230 including component 219 to be embedded into build object 230. Processor 202 can time and order operation of energy source 218, fluid applicator 216, and component placement apparatus 221, in coordination with the carriages.

Fluid applicator 216 is adapted to deposit liquid agents, as indicated by line 217, such as printing agents onto each build material layer 219a-219c based on generated print data. Fluid applicator 216 selectively deposits printing agents based on the print data. Processor 214 can transform received data of the build object to generate print data including locations and select the printing agent to be dispensed from fluid applicator 216. Fluid applicator 216 can include multiple inkjet pens to dispense multiple types of printing agent. In one example, fluid applicator 216 includes at least one first or second agent pen and at least one detailing agent pen. In one example, separate printheads are used for each of printing agent and detailing agent. Fluid applicator 216 can be carried on a moving carriage system to move across a build area 220.

The printing agent can be an energy absorbing liquid that can be applied to build material 219a-219c, for example. More than one type of suitable printing agent can be employed. The printing agent dispensable by fluid applicator 216 can be a fusing agent (FA), an activating fusing agent (AFA), a plasticizer functional agent (PFA), a conductive agent (CA) or a detailing agent (DA), and a colorant, for example, as discussed further below. In one example, a first, or activating fusing, agent is selectively applied at a build area 232 of layers 219a-219b and a second, or fusing, agent is applied by fluid applicator 216 to component receiving area 234 within the build area 232 of layer 219a.

According to one example, a suitable printing, or fusing, agent can be an ink-type formulation comprising carbon black, such as, for example, the fusing agent formulation commercially known as V1Q60Q "HP fusing agent" available from HP Inc. The fusing agent (FA), or higher energy absorbing fusing agent, can include active agents such as carbon black, carbon nanotubes, graphene, activated carbon, and other carbonized materials. The first (activated fusing) agent (AFA), or lower energy absorption second (fusing) agent, can include active agents such as nickel dithiolene complexes, cesium-doped tungsten bronze, PEDOT:PSS, or other IR absorbing materials. The conductive agent (CA) can include conductive material including transition metal (e.g., silver, copper, gold, platinum, palladium, chromium, nickel, zinc, etc.) nanomaterials (e.g., nanoparticles, nanorods, nanowires, nanotubes, nanosheets, etc.). The conductive agent can also include transition metal alloy nanomaterials, such as Au—Ag, Ag—Cu, Ag—Ni, Au—Cu, Au—Ni, Au—Ag—Cu, or Au—Ag—Pd, conductive oxides (e.g., indium tin oxide, antimony oxide, zinc oxide, etc.), conducting polymers (e.g., poly(3,4-ethylenedioxythiophene) polystyrene sulfonate (PEDOT:PSS), polyacetylene, polythiophenes, any other conjugated polymer, etc.), carbonaceous nanomaterials (e.g., graphene (single or multilayer), carbon-nanotubes (CNTs, single or multi-walled), graphene nanoribbons, fullerenes, etc.), and reactive metal systems. The plasticizer agent (PA) can include 2-methylbenzene sulfonamide, a mixture of 4-methyl-benzene and 2-methyl-benzene sulfonamide, N-butylbenzenesulfonamide (BBSA), N-ethylbenzenesulfonamide (EBSA), N-propylbenzenesulfonamide (PBSA), N-butyl-N-dodecylbenzenesulfonamide (BDBSA), N,N-dimethylbenzenesulfonamide (DMBSA), p-methylbenzenesulfonamide, o/p-toluene sulfonamide, p-toluene sulfonamide, 2-ethylhexyl-4-hydroxybenzoate, hexadecyl-4-hydroxybenzoate, 1-butyl-4-hydroxybenzoate, dioctyl phthalate, diisodecyl phthalate, di-(2-ethylhexyl) adipate, tri-(2-ethylhexyl) phosphate, and combinations thereof. The agents can also include water, surfactant, dispersant, humectant, biocide, anti-kogation agent and other additives.

The fusing agent, or second agent, can have a higher heating efficiency than the activating fusing agent, or first agent. This higher heating efficiency can be useful given that selectively applying the second agent in build area 232 created with the first agent can result in selectively heating the specific component receiving area 234 within the build material which in turn reduces the viscosity of that selected component receiving area 234 of the build material. In one example, application of energy to layer 219a including second agent raises the temperature of the second agent applied component receiving area 234 to a temperature sufficient to create a lower viscosity melt pool that will be receptive to component 236 being inserted in to component receiving area 234 (but below a critical temperature of component 236 that would cause failure of the component, such as with an electronic device). For instance, the temperature of component receiving area 234 where the second agent was applied may be raised to a temperature at or above its melt temperature. Thus, the second agent printed section (i.e., component receiving area 234) can be heated to a significant temperature hotter than the surrounding sections (i.e., build area 232) that is patterned with the activated fusing agent. In some examples, the second agent patterned region can be heated 5 to 50 degrees Celsius more than the first agent patterned region. In one example, the second agent patterned region can be heated approximately 15 degrees Celsius more than the first agent patterned region. The first agent can be an ink-type formation comprising nickel-dithiolene complexes.

In one example, the second agent can have a higher heating efficiency than the first agent and can physio-chemically reduce the viscosity of the build material. The second agent can also include a plasticizer functional agent. The plasticizer functional agent can also be an ink-type formation and can be similarly employed. The plasticizer functional agent can also be useful to reduce the viscosity of the build material at select areas by chemically altering the melt characteristics of the build material. In one example, the plasticizer functional agent can decrease the melt viscosity of the build material through a physiochemical means. In one example, multiple second agents, such as a fusing agent and a plasticizer functional agent, can be applied to locally reduce the viscosity of the build material at the component receiving area.

Printing agent can be applied to build material. Build material can be deposited onto a build surface 222 to form build material layer 219. Build surface can be a surface of a platen or underlying build layers of build material on a platen within a build chamber, for example. A build material supply device 224 can supply and deposit successive layers of build material to form a build volume within a build area 220. Build material supply device 224 can be moved across build surface 222 within the build area on a carriage, for example. Build material can be a powder polymer-based type of build material. Build material can include polymer, ceramic, metal, or composite powders (and powder-like materials), for example. Polymeric build material can be crystalline or semi-crystalline polymers in powder form. In some examples, the powder may be formed from, or may include, short fibers that may, for example, have been cut into short lengths from long strands or threads of material. According to one example, a suitable build material may be PA12 build material commercially known as V1R10A "HP PA12" available from HP Inc.

Build area 220 can be defined as a three-dimensional space in which the additive manufacturing system 200 can fabricate, produce, or otherwise generate a three-dimensional build object 230 (illustrated partially formed). Build area 220 can occupy a three-dimensional space on top of a build area surface, such as a build area bed or platen, 222. In one example, the width and length (x and y directions) of build area 220 can be the width and the length of build area platform and the height of build area 220 can be the extent to which build area platform can be moved in the z direction. Although not shown, an actuator, such as a piston, can control the vertical position of build area platen 222.

Energy source 218 can apply fusing energy, indicated by lines 223, to build material and printing agents of build material layers 219a-219c on build area surface 222 in order to form the object layers. Additional layers 219d-219x (not shown) can be formed above and below layers 219a-219c. Energy source 218 can generate heat that is absorbed by fusing energy absorbing components of the printing agents to sinter, melt, fuse, or otherwise coalesce the patterned build material. In some examples, energy source 218 can apply a heating energy, to heat the build material to a pre-fusing temperature, and a fusing energy, to fuse and/or selectively transition the build material temporarily to a viscous state where the printing agents have been applied. Thermal, infrared, visible light or ultraviolet energy can be used, for example, to heat and fuse the material. Energy source 218 can be mounted to the carriage system and moved across build surface 222 to apply the heating and fusing energies to the printing agent patterned build material. 218 can be moved over the bed one or more times to provide sufficient heating.

Build material and printing agents in each build material layer 219a-219x can be exposed to energy source 218, such as a thermal energy source. Energy source 218 can include a heating source to heat build material layer and a fusing source to fuse the first agent with the build material in locations that the first agent is selectively applied and to locally reduce the viscosity of the build material with the applied second agent to a molten state in locations that the second agent (e.g., fusing agent, plasticizer functional agent) is selectively applied. Energy source 218 can be split into the different energy sources. This can include one that is fixed above the build bed and one that is attached or separate from the print carriage and moves over the bed during prescribed times. One or both of these separate energy sources can be used to create the molten or viscous build material state during or after the formation of layer 219a.

The first agent can facilitate fusing of the build material, where printed or applied, by absorbing energy from the fusing energy source and converting the energy to heat to raise the temperature of the build material above the melting or softening point to fuse and form the object body. The second agent (e.g., fusing agent) can facilitate temporarily locally reducing the viscosity of the build material, where printed or applied, by absorbing energy at a higher heating efficiency from the fusing energy source and converting the energy to heat to raise the temperature of the build material to a viscous, or molten, state. Component 236 can be embedded into the molten build material where the agent has been applied (e.g., component receiving area 234), as discussed further below.

The agent can selectively reduce the viscosity of the build material at the component receiving area 234. The heat used to fuse the layers of the object layers can also be used to effectively fuse component 236 to and within the object layers without employing an extra process outside of the additive manufacturing process. The mechanism or process for fusing component 236 into position within build material layer(s) can include sintering, liquid evaporation or decomposition, chemical bonding between particles, (e.g., direct metal-metal bonding), drying, and/or other types of fusing processes. Additional layers of the three-dimensional object can subsequently be fabricated over the component 236 using the same additive manufacturing process. In one embodiment, additional layers of the three-dimensional object are formed as a separate part and assembled to the layers formed with component 236 embedded within.

Component placement apparatus 221 is to position component 236 within a three-dimensional object being fabricated simultaneously with fabrication of the three-dimensional object. Component placement apparatus 221 can be carried on a carriage movable across the print bed 222. In one example, component placement apparatus 221 can be connected to fluid applicator 216 and/or energy source 218, allowing it to move simultaneously with or separate from fluid applicator 216 and/or energy source 218. Component placement apparatus 221 is controlled by processor 202 for automated placement of component 236. Component placement apparatus 221 can be an automated "pick and place" apparatus.

In one example, component placement apparatus 221 can include y and z-axis actuators, a connector arm, a nozzle, a controllable vacuum source (not shown). Other suitable mechanisms are also acceptable. In one example, component 236 can be selectively engaged with and disengaged from the nozzle (via suction of the vacuum source) for carrying and placing or positioning component 236. The actuators and connector arm can be employed to move component 236 vertically and horizontally (e.g., along y and z axes) to position component 236 appropriately and apply force to embed component 236 within the molten component receiving area 234. As the component 236 is positioned into the molten material of component receiving area 234 to embed component 236, the molten material (i.e., build material and agent) is displaced into the surrounding material layer. In one example, component placement apparatus 221 maintains a moderate pressure on component 236 for a predetermined time to provide a strong adhesion between the material forming the 3D object layer and component 236 before being released, or disengaging, from component placement apparatus.

In some examples, component 236 is a pre-formed functioning electronic device and includes electronic components. In some examples, component 336 can be any type of receiver-transmitter component that is capable of transmitting a reply signal when electronically interrogated. In one example, the electronic device is a radio-frequency identification device (RFID). The RFID can communicate with an external, remote communication source. Other types of electronic devices including any type of passive and/or active electronic component (e.g., resistor, transistor, capacitor, diode, inductor, battery, wire or conductive pin, universal serial bus connector or other electronic connector, sensor, integrated circuit, etc.) can also be employed.

Figure 3A:
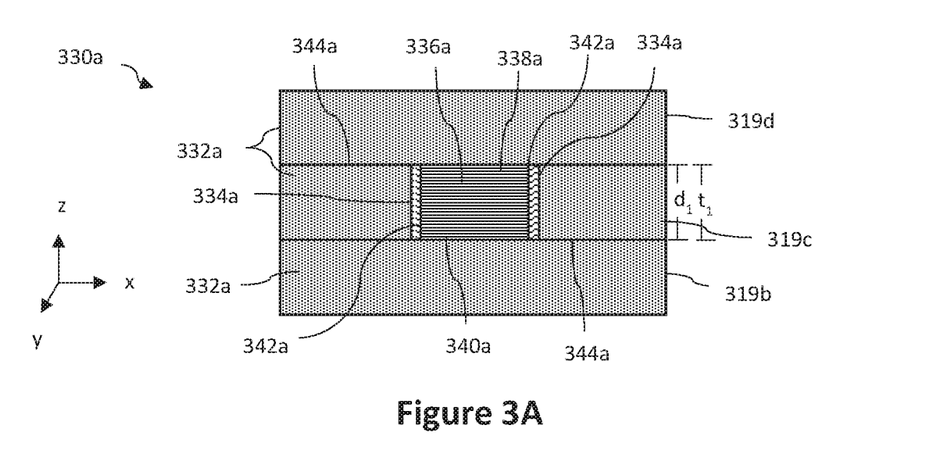
FIGS. 3A-3C are schematic cross-sectional side views of three-dimensional build objects including a component disposed within a component receiving area in accordance with aspects of the present disclosure.
Figure 3B:
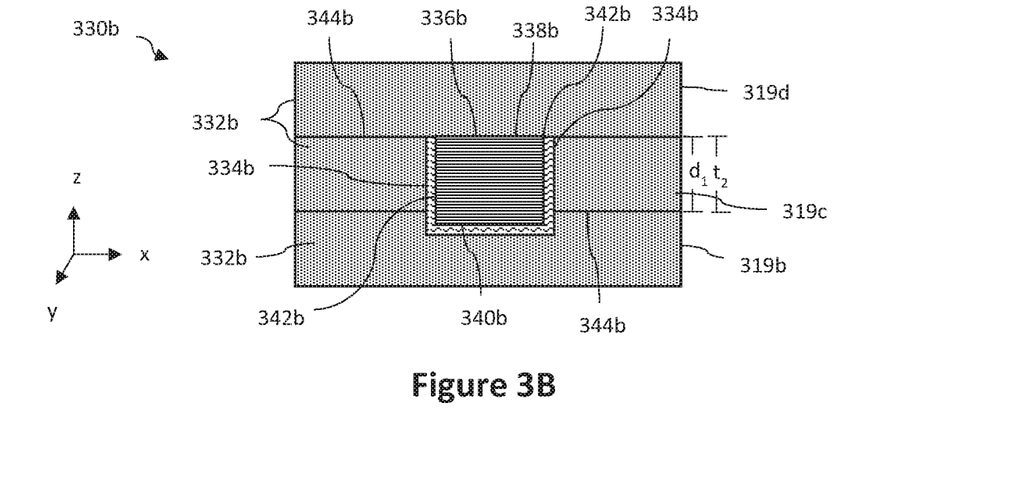
Figure 3C:
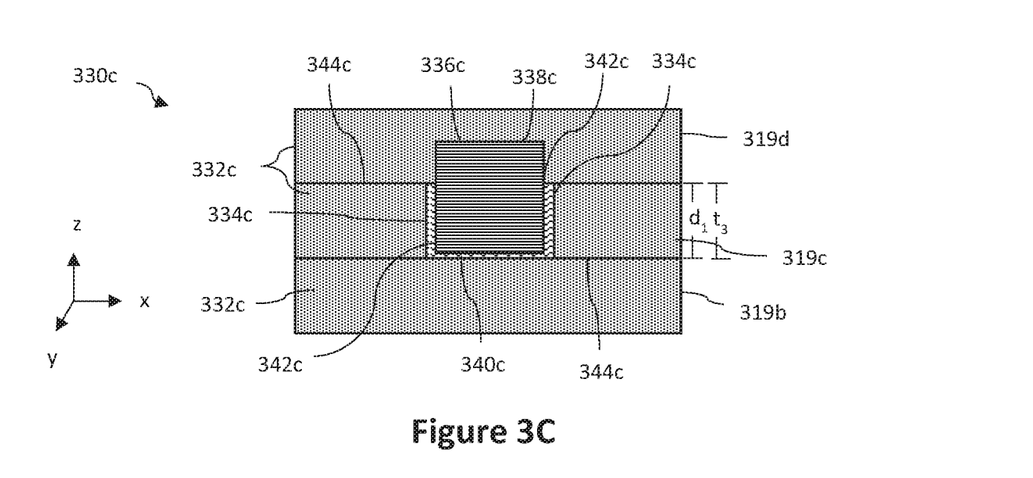

FIGS. 3A-3C are schematic cross-sectional side views of three-dimensional build objects 330a-330c including component 336a-336c disposed within component receiving area 334a-334c in accordance with aspects of the present disclosure. Build layers 319b-319d form build areas 332 and component receiving area 334. Each component 336a-336c can include a top surface 338a-c, a bottom surface 340a-c, and side surfaces 342a-c extending between top surface 338a-c and bottom surface 340a-c. Component 336a-336c has a thickness "$t_1$"-"$t_3$" and the build material layer that component 336a-336c is embedded in has a thickness "$d_1$". Build material layers 319b-319d can have equivalent, or substantially equivalent thicknesses or can be different thicknesses. Component 336 is placed within a layer, or layers, of build material 319b-319d at component receiving area 334. Component 336 is positioned a pre-determined distance (along the z-axis) within the build material layers 319b-d. Although only one component 336 is illustrated, it is understood that multiple components 336 can be included either within the same build layer or within different build layers 319a-319x.

In one example, as illustrated in FIG. 3A, component 336a has a thickness "$t_1$" approximately equal to the thickness "$d_1$" of layer 319c of the 3D object 330a. In this example, component 336a can be forced downward into the build layer 319c thickness to embed component 336a within the build layer 319c and within the build object 330a with a moderate amount of pressure. In one example, top surface 338a of component 336a can be flush, or substantially flush, with top surface 344a of build material layer 319c that component 336a is embedded within. As used herein, the term "flush" refers to arrangements where the surfaces are flush (i.e., coplanar or level). Layer 319d can be formed over layer 319c to encapsulate, or fully embed or enclose component 336a within 3D object 330a.

In another example, as illustrated in FIG. 3B, component 336b can be positioned to extend into the layer 319b below layer 319c that agent is dispensed at. In one example, the energy absorbed by the agent at the component receiving area 334 in layer 319c can "bleed" into and partially extend into layer 319b. This allows the component to be placed into, or recessed into, the layer(s) while at least one layer is in a molten state. Component 336b can be positioned and inserted into the molten build material at the component receiving area 334b with enough pressure to at least partially embed the electronic component in component receiving area 334b, but not so much pressure that the component 334b contact fused material below the molten material of the component receiving area 334b. In this manner, component 336b can be embedded into layers 319b and 319c while build material contacted by the agent is in a molten state. Top surface 338a can be recessed, flush, substantially flush, or extend slightly above top surface 344b of build material layer 319c.

FIG. 3C illustrates component 336c embedded within layer 319c and extending above top surface 344c of layer 319c. Component 336c can be greater than a single material layer thickness and less than the thickness of two layers of 3D object 330c. Top surface 338c of component 336c is positioned below a top surface of layer 319d to allow the build material to be spread in layer 319d without the spreading device contacting component in any substantial manner. The agent dispensed at component receiving area 334c of layer 319c provides a molten state of material for bonding with electronic component 336.

Figure 3D:
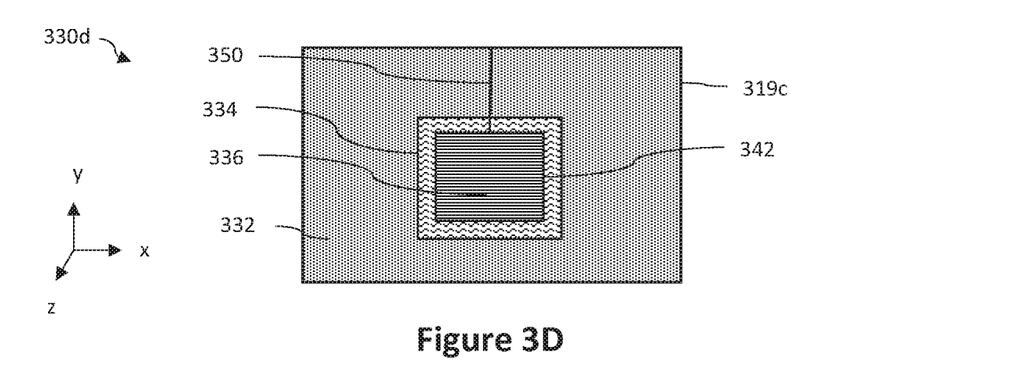
FIG. 3D is a schematic cross-sectional top view of a three-dimensional build object including a component disposed within a component receiving area in accordance with aspects of the present disclosure.

FIG. 3D illustrates a cross-sectional view through layer 391c in accordance with aspects of the present disclosure. Component 336 is embedded within component receiving area 334. Component 336 can be surrounded by the viscous material of component receiving area 334 along sides 342. Component 336 is bonded to the fused material surrounding component 336.

In one example, electronic component 336 is electrically connected to a conductive region 350 within 3D object 330. Conductive region 350 can be formed with the build layer(s) with a printed electrically conductive agent into a specific region or can be added as an additional electrical component placed within, or onto, the build layers in accordance with aspects of the present disclosure. Conductive region 350 is illustrated as a single linear conductive region, however, conductive region 350 can include multiple conductive regions and can extend through multiple layers and in multiple directions and orientations.

In one example, conductive region 350 can form an antenna for electronic communication with electronic component 336 (e.g., RFID). In one example, conductive region 350 can be formed, or printed, as an antenna within the 3D build object during a Multi Jet Fusion process. Electronic device 336 can be embedded within the 3D build object (pursuant to the data representation of the CAD model) to preserve the structural integrity of the 3D object 330 and that allows electronic component 336 to communicate with one or more scanning systems. In one example, where electronic component 336 is disposed near an exterior surface or edge, employing a plasticizer agent as the second agent applied to component receiving area 334 can provide for lower melt viscosity near the exterior surface or edge of the 3D object and maintain the dimensional accuracy of the 3D object. In one example, electronic component 336 can be disposed at a central location within the 3D object, spaced from exterior or exposed surfaces of the 3D object to aid in maintaining dimensional accuracy of the 3D object. Conductive region 350 (e.g., antenna) can be employed to aid in the communication. Component 236, 336, such as an RFID, can contain a variety of information, such as identification information, routing information, safety information, handling information, shipping information, and other build and post-build information.

Although FIGS. 2 and 3A-3D illustrate a single component being inserted into a single layer of a 3D object, examples of the present disclosure can be used to insert and embed any number and type of components into one or any number of layers of the 3D object. Moreover, the number of components can include a variety of different types of components.

Figure 4:
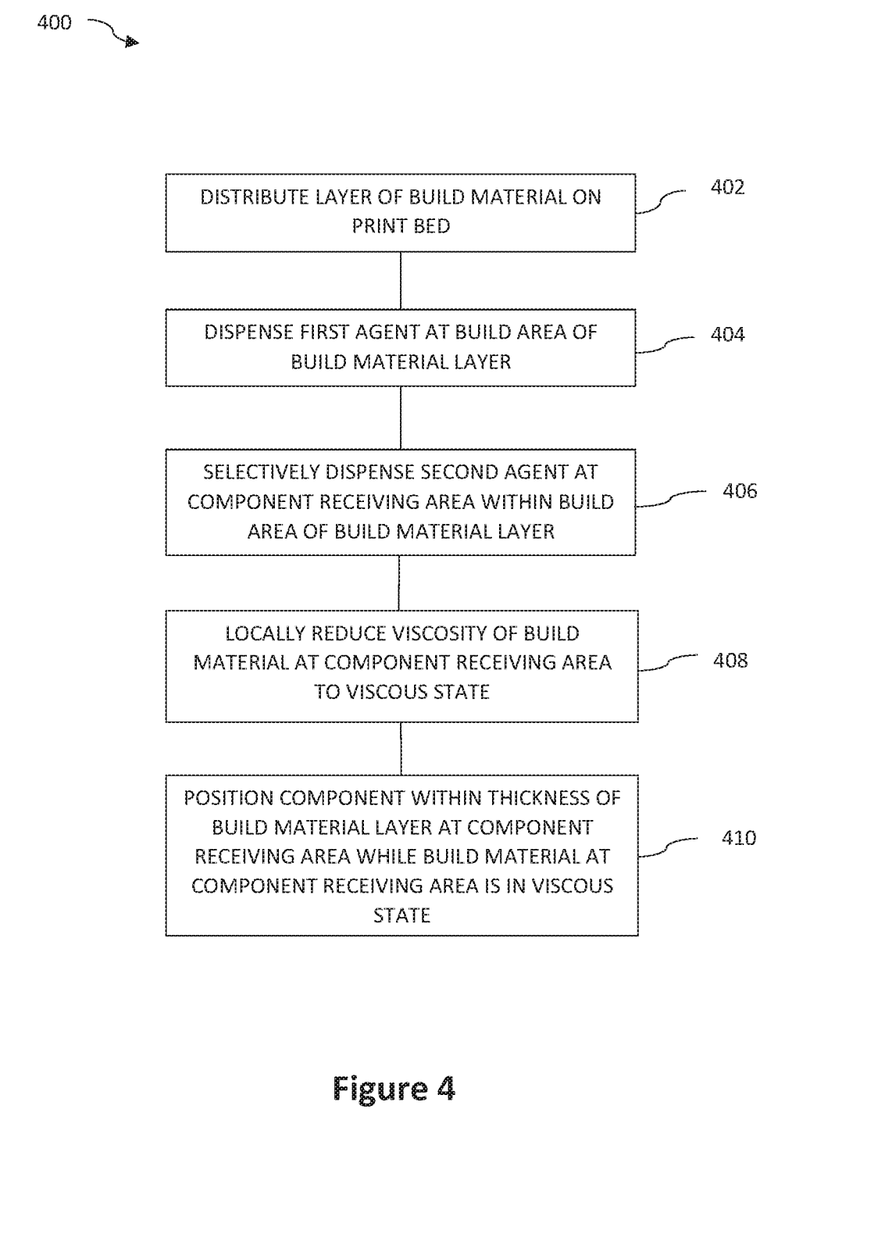
FIG. 4 is a flow diagram of an example additive manufacturing method in accordance with aspects of the present disclosure.

FIG. 4 is a flow diagram of an example additive manufacturing method 400 in accordance with aspects of the present disclosure. At 402, a layer of build material is distributed onto a print bed. At 404, a first agent is dispensed at a build area of the build material layer. At 406, a second agent is selectively dispensed at a component receiving area within the build area of the build material layer. At 408, a viscosity of the build material is locally reduced at the component receiving area to a viscous state. At 410, component is positioned within a thickness of the build material layer at the component receiving area while the build material at the component receiving area is in the viscous state.

Figure 5:
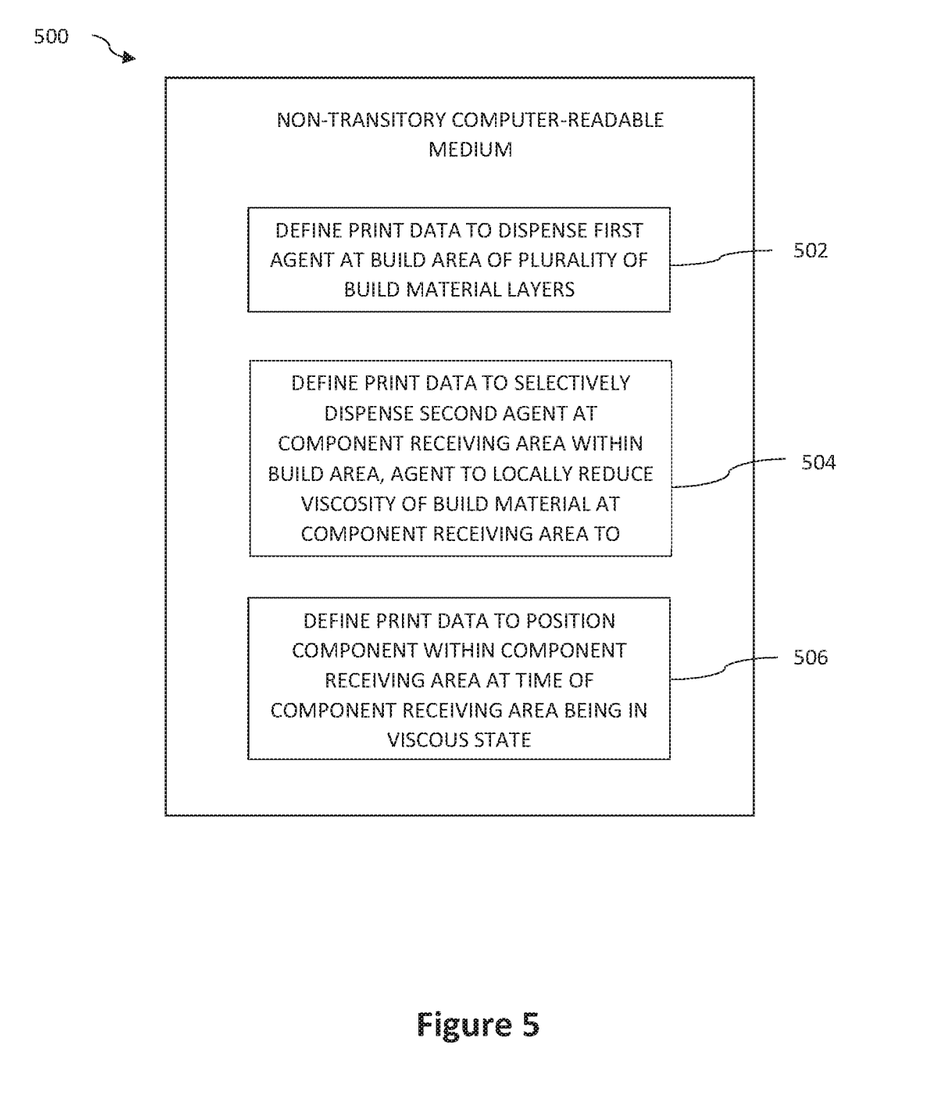
FIG. 5 is a block diagram of an example non-transitory computer readable medium comprising a set of instructions executable by a processor in accordance with aspects of the present disclosure.

FIG. 5 is a block diagram of an example non-transitory computer readable medium 500 comprising a set of instructions executable by a processor in accordance with aspects of the present disclosure. In one example, non-transitory computer-readable storage medium 500 is included in the memory of the additive manufacturing system and includes a set of instructions 502-506 executable by the processor. Instruction 502 can define print data to dispense a first agent at a build area of a plurality of build material layers. Instruction 504 can define print data to selectively dispense a second agent at a component receiving area within the build area, the agent to locally reduce a viscosity of build material at the component receiving area to a viscous state. Instruction 506 can define print data to position a component within the component receiving area at a time of the component receiving area being in a viscous state.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of producing a three-dimensional object comprising:
distributing a layer of build material on a print bed;
dispensing a first agent at a build area of the build material layer, the build area including build material within a component receiving area and build material outside of the component receiving area;
selectively dispensing a second agent at the component receiving area within the build area of the build material layer;
locally reducing a viscosity of the build material at the component receiving area to a viscous state relative to the build material outside of the component receiving area; and
positioning a component within a thickness of the build material layer at the component receiving area while the build material at the component receiving area is in the viscous state.

2. The method of claim 1, wherein locally reducing the viscosity at the component receiving area includes thermally activating the second agent with the build material.

3. The method of claim 1, comprising:
applying a fusing energy to fuse the build material at the build area and to locally reduce the build material to a viscous state and to fuse the build material at the component receiving area.

4. The method of claim 3, wherein the viscous build material and the second agent at the component receiving area bond the component to the build material within the component.

5. The method of claim 1, wherein positioning the component within a thickness of the build material layer comprises:
engaging the component with a component placement apparatus,
moving the component into a location above the component receiving area,
moving the component vertically downward into a thickness of the build material layer at the component receiving area, and
releasing the component from the component placement apparatus.

6. The method of claim 1, wherein positioning the component within a thickness of the build material layer comprises:
applying a force onto the component to move the component into the build material layer at the component receiving area to a pre-determined distance within the build material layer while in a viscous state until a top surface of the component is substantially planar with a top of the build material layer.

7. The method of claim 1, wherein positioning the component within a thickness of the build material layer includes displacing a volume of the build material and the second agent at the component receiving area with the component while the build material is in the viscous state.

8. The method of claim 1, comprising:
forming additional build material layers to encase the component within the three dimensional object.

9. The method of claim 1, comprising:
coupling the component to an antenna formed within the three-dimensional object, wherein the component is a radio-frequency identification device.

10. A non-transitory computer-readable data storage medium storing instructions executable by a processor to:
define print data to dispense a first agent at a build area of a plurality of build material layers, the build area including build material within a component receiving area and build material outside of the component receiving area;
define print data to selectively dispense a second agent at the component receiving area within the build area, the second agent to temporarily and locally reduce a viscosity of build material at the component receiving area to a viscous state relative to the build material outside of the component receiving area; and
define print data to position a component within the component receiving area at a time of the component receiving area being in a viscous state.

\* \* \* \* \*